United States Patent
Vreuls

(10) Patent No.: US 11,858,061 B2
(45) Date of Patent: Jan. 2, 2024

(54) TOOLING FOR RETAINING A BLADE DURING FRICTION WELDING THEREOF TO A ROTOR ELEMENT OF AN AIRCRAFT TURBOMACHINE

(71) Applicant: SAFRAN AERO BOOSTERS, Herstal (BE)

(72) Inventor: Bruno Henri Marcel Vreuls, Herstal (BE)

(73) Assignee: SAFRAN AERO BOOSTERS, Herstal (BE)

( * ) Notice: Subject to any disclaimer, the term of this patent is extended or adjusted under 35 U.S.C. 154(b) by 5 days.

(21) Appl. No.: 17/641,974

(22) PCT Filed: Sep. 3, 2020

(86) PCT No.: PCT/EP2020/074659
§ 371 (c)(1),
(2) Date: Apr. 4, 2022

(87) PCT Pub. No.: WO2021/047999
PCT Pub. Date: Mar. 18, 2021

(65) Prior Publication Data
US 2022/0305582 A1   Sep. 29, 2022

(30) Foreign Application Priority Data
Sep. 10, 2019 (BE) .................................. 2019/5599

(51) Int. Cl.
*B23K 20/00* (2006.01)
*B23K 20/12* (2006.01)
*B23K 101/00* (2006.01)

(52) U.S. Cl.
CPC ...... *B23K 20/129* (2013.01); *B23K 2101/001* (2018.08)

(58) Field of Classification Search
CPC .......... B23K 2101/001; B23K 20/1205; B23K 20/129; B23K 11/002; B23K 20/26
See application file for complete search history.

(56) References Cited

U.S. PATENT DOCUMENTS 4,934,583 A * 6/1990 Patsfall ................... F01D 5/005
228/119
5,148,957 A * 9/1992 Searle ................ B23K 20/1205
228/2.1

(Continued)

FOREIGN PATENT DOCUMENTS

| | | |
|---|---|---|
| EP | 1 000 697 A2 | 5/2000 |
| EP | 3 321 022 A1 | 5/2018 |
| JP | 2015-108338 A | 6/2015 |

OTHER PUBLICATIONS

International Search Report dated Nov. 30, 2020, issued in corresponding International Application No. PCT/EP2020/074659, filed Sep. 3, 2020, 7 pages.

(Continued)

*Primary Examiner* — Erin B Saad
(74) *Attorney, Agent, or Firm* — CHRISTENSEN O'CONNOR JOHNSON KINDNESS PLLC

(57) ABSTRACT

A tooling holds a blade during friction welding to a rotor element. The tooling includes a fixed jaw having a central part; two arms separated by a distance d for receiving at least one portion of the blade; and a fixed jaw body with bearing surfaces and a bore for receiving at least one portion of the blade. The bearing surfaces are configured to come into contact with the blade. A movable jaw includes a movable bearing surface that comes into contact with the blade, and pressure means that moves the movable jaw towards the fixed jaw body to press the blade.

15 Claims, 2 Drawing Sheets

(56) References Cited

U.S. PATENT DOCUMENTS

| | | | | | |
|---|---|---|---|---|---|
| 5,486,262 | A | * | 1/1996 | Searle | B23K 20/1205 228/2.1 |
| 5,678,749 | A | * | 10/1997 | Pratt | B23K 20/1205 228/2.1 |
| 5,813,593 | A | * | 9/1998 | Galaske, Jr. | B23K 20/1205 228/2.1 |
| 6,478,545 | B2 | * | 11/2002 | Crall | B23K 20/129 29/889.23 |
| 6,933,459 | B2 | * | 8/2005 | Helder | B23K 11/002 29/889.22 |
| 8,002,162 | B2 | * | 8/2011 | Bayer | B23K 20/129 228/2.1 |
| 8,479,391 | B2 | * | 7/2013 | Chin | F01D 5/005 228/2.1 |
| 9,597,748 | B2 | * | 3/2017 | Lardy | B23K 20/129 |
| 10,525,548 | B2 | * | 1/2020 | Mast | B23K 20/22 |
| 11,149,552 | B2 | * | 10/2021 | DiPietro, Jr. | F01D 5/225 |
| 2006/0051211 | A1 | * | 3/2006 | Ferte | F01D 5/34 416/213 R |

OTHER PUBLICATIONS

Written Opinion dated Nov. 30, 2020, issued in corresponding International Application No. PCT/EP2020/074659, filed Sep. 3, 2020, 6 pages.

English translation of Written Opinion dated Nov. 30, 2020, issued in corresponding International Application No. PCT/EP2020/074659, filed Sep. 3, 2020, 6 pages.

International Preliminary Report on Patentability dated Mar. 15, 2022, issued in corresponding International Application No. PCT/EP2020/074659, filed Sep. 3, 2020, 7 pages.

* cited by examiner

TOOLING FOR RETAINING A BLADE DURING FRICTION WELDING THEREOF TO A ROTOR ELEMENT OF AN AIRCRAFT TURBOMACHINE

FIELD OF THE DISCLOSURE

The present disclosure relates to a tooling for retaining a blade during friction welding thereof to a rotor element of an aircraft turbomachine. The disclosure also relates to a method of friction welding.

BACKGROUND

The friction welding is a method for joining elements together, during which the heat is supplied by the friction between those elements. When a sufficient temperature is reached, the elements are joined together under the action of a pressure (forging).

EP2535516B1 discloses a process of friction welding blades to a drum, a rotor part of a compressor of a turbomachine of an aircraft. The disclosed method provides that during the friction welding operation, it is the blade that is set in motion relative to the drum, which remains stationary. This document proposes a gripping device to retain the blade during the friction welding operation. The gripping of the blade during the welding process requires special attention as it has to withstand high axial and transverse forces during the friction movement, while retaining the blade firmly and ensuring its correct positioning in relation to the drum. In addition, such a gripping device must be able to be used in congested areas such as between two blades previously fixed to the drum.

The quality of the weld, and ultimately the quality of the turbomachine, depends on the robustness and precision of the gripping device as well as on its ability to reproduce the welding operation identically for different blades. In addition, it is important to have a gripper tool that allows a controlled and moderate cycle time for welding the blades to the drum. The inventors have observed that there is a need to find another, more robust gripping tool, which has overall dimensions that are compatible with a confined environment.

SUMMARY

According to a first aspect, one of the aims of the disclosure is to provide a tooling for holding a blade during its friction welding to a rotor element, for example a drum or disc, which is more robust and whose size is compatible with a confined environment. To this end, the inventors propose a tooling for holding a blade during friction welding thereof to a rotor element of an aircraft turbomachine, comprising:
a fixed jaw comprising:
a central part adapted to be attached to a vibrating plate of a friction welding machine;
two arms substantially parallel to each other, separated by a distance d for receiving at least a portion of the blade and substantially perpendicular to the central part;
a fixed jaw body disposed between the two arms, comprising bearing surfaces and a bore for receiving at least a portion of the blade, the bearing surfaces being intended to come into contact with faces of the blade;
a movable jaw configured to slide along the two arms and comprising a movable bearing surface intended to come into contact with a face of the blade;
pressure means for moving the movable jaw towards the fixed jaw body to press the blade between the movable jaw and the fixed jaw body.

The transfer of motion, for example linear or orbital, between the vibrating plate of the friction welding machine and the tooling is done through its central part. Preferably, the widest surface of the central part is entirely in contact with the vibrating plate. In addition, each of the central part, the parallel arms and the fixed jaw body provides rigidity in a different spatial direction, ensuring excellent rigidity of the fixed jaw assembly in all three spatial directions. Such rigidity minimizes deformation of the tooling due to vibration, thereby improving the retaining accuracy of the tooling during welding. The minimization of deformations also improves the transmission of movement from the vibrating plate to the blade to be welded, which reduces the presence of defects in the weld and thus improves its quality.

Advantageously, the parallel arms of the tooling allow the movable jaw to move relative to the fixed jaw in a single spatial direction, allowing better control of the tightening and positioning action of the blade to be welded against the fixed jaw, which improves the repeatability of the welding operation. In addition, the parallel arms ensure alignment between the blade to be welded and other elements such as blades already welded.

With the tooling of the disclosure, it is possible to have a configuration where the blade to be welded is retained by the tooling only by one of the portions. The remainder of the blade can be retained in a cantilevered manner, part of which is confined within the bore of the fixed jaw body. The bore corresponds to a hole through the fixed jaw body, intended to confine in a non-contact manner a part of the blade to be welded that is located between the two arms of the tooling. The non-contact aspect of the containment prevents possible damage to the blade due to vibration induced during friction welding.

During welding, the blade to be welded is coupled to the fixed jaw in two spatial directions. The configuration of the fixed jaw makes it sufficiently robust to withstand forces in these two spatial directions. The pressure means allows the movable jaw to be tightened against the fixed jaw so as to support the forces in the tightening direction.

Preferably, each of the two arms of the fixed jaw comprises a groove.

Preferably, the pressure means are on board the tooling.

More preferably, the movable jaw comprises two lateral edges configured to slide in the grooves of the arms. This configuration improves the cooperation between the movable jaw and the arms of the fixed jaw. This allows for efficient sliding and guiding of the movable jaw, which thus maintains its orientation and trajectory during its movement. In addition, the lateral edges increase the rigidity and robustness of the movable jaw, enabling it to withstand high forces in the tightening direction.

Advantageously, the movable jaw comprises a reinforcement portion substantially perpendicular to the two lateral edges.

More advantageously, the movable bearing surface, the lateral edges and the reinforcement portion define an open area configured to receive an adjacent blade already welded during the welding of the blade to be welded.

In other words, the movable jaw preferably has an "O" shape, i.e., the movable jaw comprises a through hole. This hole allows the passage of an adjacent blade already welded during the welding operation of the blade to be welded. The reinforcement portion ensures the mechanical strength and stiffness of the movable jaw even when the force exerted by the pressure means is high.

Such a configuration of the movable jaw is resistant to compression, rigid and therefore not very deformable, and allows an effective grip on the blade to be welded while being usable in a workspace cluttered with other blades already welded.

Advantageously, the pressure means are configured to being controlled by a control unit. In this embodiment, the movement of the movable jaw and the tightening and loosening of the blade to be welded can therefore be automated. This automation improves the accuracy and repeatability of the grip of the blade to be welded with respect to a manual tightening device using, for example, screws. This lack of human intervention increases the welding rate of the blades and also reduces the risk of accidents. The control unit can also be remotely controlled by a computer using an algorithm. In a still preferred embodiment of the disclosure, the tooling of the disclosure comprises such a control unit.

Preferably, the pressure means comprise one or more cylinders. These cylinders may be, for example, hydraulic, pneumatic or electric.

More preferably, each cylinder comprises a piston mechanically coupled to the movable jaw.

Even more preferably, each arm of the fixed jaw is able to accommodate one or two cylinders, so that the transmission of the force provided by the cylinder(s) is essentially parallel to the arms. In such a configuration, where the pressure means are mounted on the tooling, the transmission of the force is made through the pistons, the cylinders can therefore be installed at the ends of the arms of the fixed jaw, thus preventing the actual welding area from being unnecessarily cluttered.

In this preferred embodiment, the pistons are located along the arms of the fixed jaw, so the force is strictly transmitted along the sliding axis of the movable jaw. Minimizing unnecessary stresses, i.e., outside the sliding axis, prevents premature ageing of the tooling.

Advantageously, the movable bearing surface of the movable jaw has a knurling. As the tightening face is knurled, i.e., grooved, the movable bearing surface clings better to the blade to be welded, and the latter is thus retained more firmly.

The blade to be welded preferably comprises
an assembly portion to be welded to the rotor element;
a platform;
a functional part;
the platform being located between the assembly portion and the functional part.

Preferably, the bearing surfaces of the fixed jaw are intended to come into contact with the platform, so that the functional part of the blade is retained in a cantilevered manner to avoid transmission of vibration to the functional part.

Preferably, the rotor element is a drum of a low-pressure compressor of a turbomachine of an aircraft.

In practice, the assembly portion generally comprises an assembly surface adapted to come into contact with another assembly surface belonging to the drum. The friction between these assembly surfaces increases the temperature of the assembly portion of the blade so as to forge it onto the drum.

Preferably, the platform of the blade is parallelepipedic in shape. The platform then has two parallel main faces on which the assembly portion and the functional portion are respectively coupled. Such a parallelepiped platform also has four parallel lateral faces in pairs. Each of these lateral faces is adapted to come into contact with the bearing surfaces of the fixed jaw body and the movable bearing surface. Thus, the gripping of the object is ensured at 360°. More preferably, the contour defined by the lateral faces of the platform conforms to the perimeter of the open area (or bore) described by the bearing surfaces of the fixed jaw body in order to distribute the forces as uniformly as possible.

The functional part of the blade typically corresponds to a vane. The vane of the blade is intended to be confined without contact in the bore of the fixed jaw body during the welding operation.

A further aspect of the disclosure is to provide an assembly for a friction welding process comprising:
a tooling as described above;
pins;
a vibrating plate for imparting a vibratory motion to the tooling, the latter being attached to the vibrating plate by means of the pins.

In this proposed embodiment, the interface between the tooling and the vibrating plate comprises pins which perform both a locating function and a function of elements ensuring fastening. The use of these pins allows rapid and automated clamping/unclamping of the tooling to the vibrating plate.

Yet another aspect of the disclosure is to provide a method of friction welding a blade to a rotor element of a turbomachine of an aircraft, comprising the following steps:
a. providing a tooling according to the disclosure;
b. providing a friction welding machine comprising a vibrating plate;
c. attaching the central part of the tooling to the vibrating plate;
d. arranging a portion of the blade to be welded in the bore of the fixed jaw body, so that the bearing surfaces come into contact with the blade;
e. bringing into contact the movable bearing surface of the movable jaw with the blade;
f. pressing the blade between the movable jaw and the fixed jaw body by means of the pressure means;
g. bringing into contact the blade and the rotor element;
h. actuating the friction welding machine so as to induce a relative movement between the blade and the rotor element to reach a welding temperature;
i. stopping the vibrating plate and pressing the blade against the rotor element so as to join them together;
j. releasing the blade from the tooling.

Preferably, the blade comprises a platform and step (e) consists in bringing into contact the bearing surface of the movable jaw with the platform of the blade.

Preferably, the step c. consists in tightening the central part of the tooling to the vibrating plate by means of pins.

Thus, in the case of friction welding a blade to a drum of a compressor of an aircraft turbomachine, the method of the disclosure comprises first placing the blade in the tooling, tightening the blade in the tooling and then the blade coming into contact with the drum via their respective assembly surfaces. Ideally, after contact the assembly surfaces are contained in the same plane. In a second step, the blade is set in motion along a linear or, preferably, orbital trajectory, contained in a plane parallel to the plane of the assembly surfaces. Thus, the friction generates a temperature rise at the interface of the assembly surfaces. The drum is retained stationary throughout the welding process. The correct relative positioning of the assembly surfaces is achieved by (i) fastening the pins of the tooling to the vibrating plate and (ii)

tightening the blade between the fixed and movable jaw bodies. In a third step, when the desired temperature of the assembly surfaces is reached, the blade is immobilized, possibly re-centered and then pressed against the drum to assemble the hot portions of the blade and drum. Finally, the blade is unloosed by releasing the movable jaw, then released by a withdrawal movement of the tooling. Such a welding cycle can be repeated for the purpose of welding another blade onto the drum.

The advantages mentioned for the tooling apply mutatis mutandis to the method.

DESCRIPTION OF THE DRAWINGS

Further features and advantages of the disclosure will become apparent from the following detailed description, for the understanding of which reference is made to the appended figures, among which.

DETAILED DESCRIPTION

The present disclosure is described with particular embodiments and references to figures, but the disclosure is not limited thereby. The drawings or figures described are only schematic and are not limiting. In the context of this document, the terms "first" and "second" are used only to differentiate between the various elements and do not imply any order between these elements. The reference signs do not limit the scope of the disclosure, but when included in the claims. In the figures, identical or similar elements may bear the same references.

Figure 1:
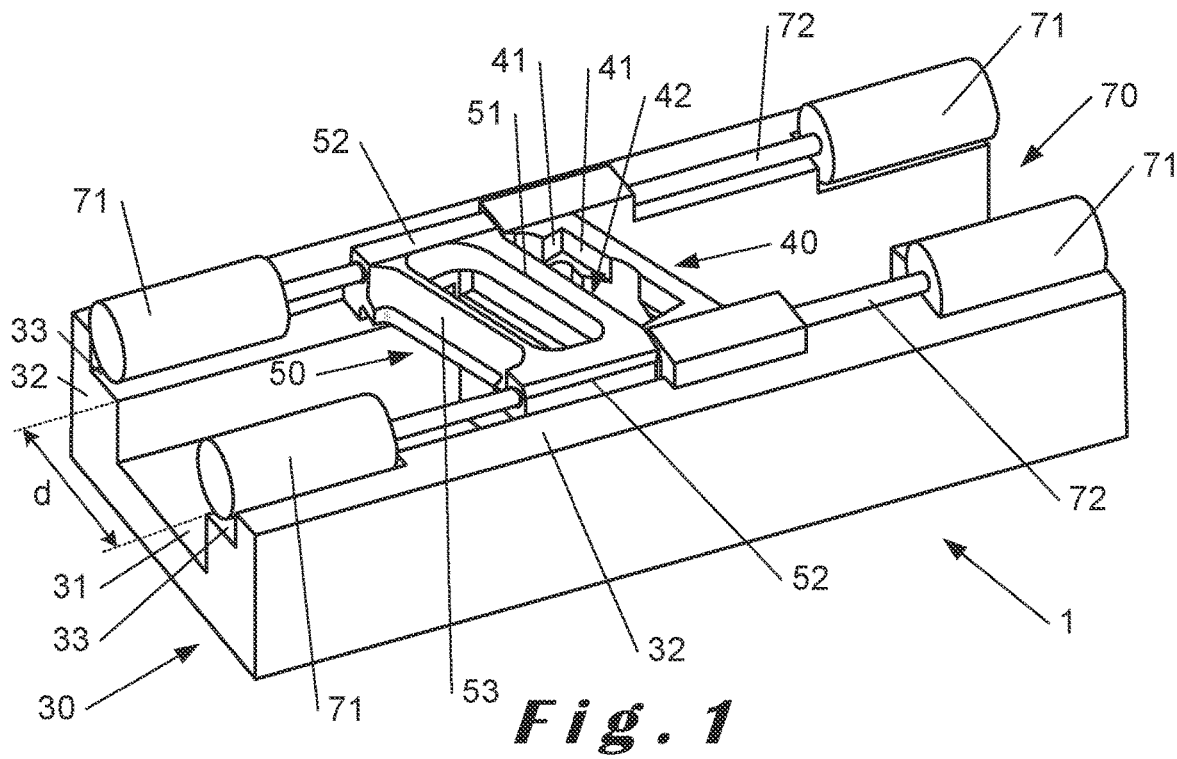
FIG. 1 shows the tooling according to one embodiment of the disclosure.

FIG. 1 shows tooling 1 according to one embodiment of the disclosure. It comprises a fixed jaw 30 comprising a central part 31, two arms 32 substantially parallel to each other and a fixed jaw body 40.

The central part 31 and the arms 32 are arranged together to form a "U" shape in a cross-sectional view of the fixed jaw. In a preferred embodiment, the distance d between the arms 32 is smaller than the length of the arms 32, giving an elongated appearance to the tooling 1. Typically, the length of the arms 32 is at least twice of d. The central part 31 of the fixed jaw may be discontinuous.

The fixed jaw body 40 occupies a space between the two arms 32 that is approximately half the length of the arms 32. The fixed jaw body 40 is coupled to the arms 32 at its lateral sides and, possibly, coupled to the central part 31 at its lower portion. The fixed jaw body 40 is preferably arranged obliquely with respect to the arm 32. The fixed jaw body 40 has a bore 42. This bore 42 corresponds to a recess in the depth of the fixed jaw body 40. The entrance to this recess is preferably machined in such a way as to define bearing surfaces 41. During the welding operation of a blade 10 on a rotor element 20, the bore 42 is provided to receive, preferably entirely, the functional part 13 of the blade 10. The shape of the bore 42 preferably mimics the shape of the functional part 13 of the blade 10 so as to minimize the size of the recess while ensuring non-contact containment of the functional part 13 of the blade 10. The entrance to the bore 42 is preferably machined to define bearing surfaces 41 intended for coming into contact with a part of the blade 10 known as the platform 12. Preferably, there are three planar bearing surfaces 41 intended for coming into contact with three lateral faces 14 of a parallelepiped platform 12 of the blade 10. Even more preferably, the platform 12 is a rectangular parallelepiped. Thus, in this preferred embodiment, the bearing surfaces 41 are in contact with part of the perimeter of the platform 12 of the blade 10. Furthermore, the plane of each bearing surface 41 is preferably perpendicular to the plane of linear or, preferably, orbital motion of the friction weld in such case.

Preferably, the movable jaw 50 is arranged to translate only along the arms 32. In a preferred embodiment, the arms 32 comprise grooves 33 parallel to the arms 32. These grooves 33 are preferably provided to receive lateral edges 52 of the movable jaw 50 to improve the sliding. The movable jaw 50 comprises a movable bearing surface 51, preferably parallel to the fixed jaw body 40 and thus oblique with respect to the arms 32 when the fixed jaw body 40 is itself oblique with respect to the arms 32. Preferably, the movable bearing surface 51 remains parallel to the fixed jaw body 40 when the movable jaw 50 slides. When the blade 10 is positioned in the fixed jaw body 40 (the functional part 13 in the bore 42 and the platform in contact with the bearing surfaces 41 according to a preferred embodiment), the movable jaw 50 is arranged to move towards the fixed jaw body 40 so that the movable bearing surface 51 come into contact with a face 14 of the platform 12 of the blade 10. Preferably, the entire perimeter of the platform 12 is in contact with either the bearing surface 41 or the movable bearing surface 51. More preferably, three flat bearing surfaces 41 are intended to come into contact with three lateral faces 14 of a parallelepipedic platform 12, then the movable bearing surface 51, which is flat, is intended to come into contact with the fourth face 14 of the platform 12. Preferably, the movable bearing surface 51 is perpendicular to the plane of the linear or orbital movement of the friction welding. Optionally, the movable bearing surface 51 has a texture, obtained by machining for example, to increase the coefficient of static friction between the movable bearing surface 51 and a face 14 of the blade 10.

Preferably, the movable jaw 50 comprises a reinforcement portion 53 contiguous to the two lateral edges 52 and preferably perpendicular to the two lateral edges 52, so that the reinforcement portion 53 is parallel to the movable bearing surface 51. In this latter configuration, the movable bearing surface 51 is coupled to one end of the lateral edges 52 and the reinforcement portion 53 is coupled to the other end of the lateral edges 52. In such a preferred embodiment, the movable bearing surface 51, the lateral edges 52 and the reinforcement portion 53 define an opening in the movable jaw 50.

The tooling 1 of the disclosure comprises pressure means 70 for moving the movable jaw 50 and for pressing for example a platform 12 of a blade 10 between the movable jaw 50 and the fixed jaw 40. The pressure means 70 ensures the tightening and loosening of the blade 10 in the tooling. Typically, during the tightening action of an element 10 to be welded (blade 10 for example), under the effect of the pressure means 70, the movable bearing surface 51 exerts a force on the platform 12 of the blade 10 against the support surface 41 which is opposite the movable bearing surface 51. The platform 12 is retained firmly by tightening two parallel faces 14 of the platform 12. Preferably, the pressure means 70 are electric, pneumatic or hydraulic cylinders 71 which can develop either a force directly applied to the movable jaw 50, or a torque which through a screw will be transformed into a force on the movable jaw 50. The cylinders 71 are for example two or four in number and are preferably located at the ends of the arms 32 of the fixed jaw 30. The arms 32 of the fixed jaw 30 are preferably arranged in such a way that the cylinders 71 are integrated into the tooling 1. In the configuration with two cylinders 71, each of them applies a force on either side of the movable jaw 50 so that if one cylinder 71 pushes the movable jaw 50 then the other cylinder 71 pulls it. In the configuration with four cylinders 71, they preferably work in pairs, two that push the movable jaw 50 and two that pull it in order to double the transmitted force. The force is transmitted between each cylinder 71 and the movable jaw 50 by means of a piston 72. The pistons 72 are preferably arranged so as to transmit a force strictly parallel to the arms 32. Preferably, the cylinders 71 are controlled by a control unit. This control unit can itself be controlled by an algorithm so as to automate the procedure for tightening and loosening the blade 10 in the tooling 1. Thus, the tightening force, the cycle time between the tightening and loosening and other parameters relevant to the welding operation can be pre-programmed and then transmitted to the control unit.

Figure 2:
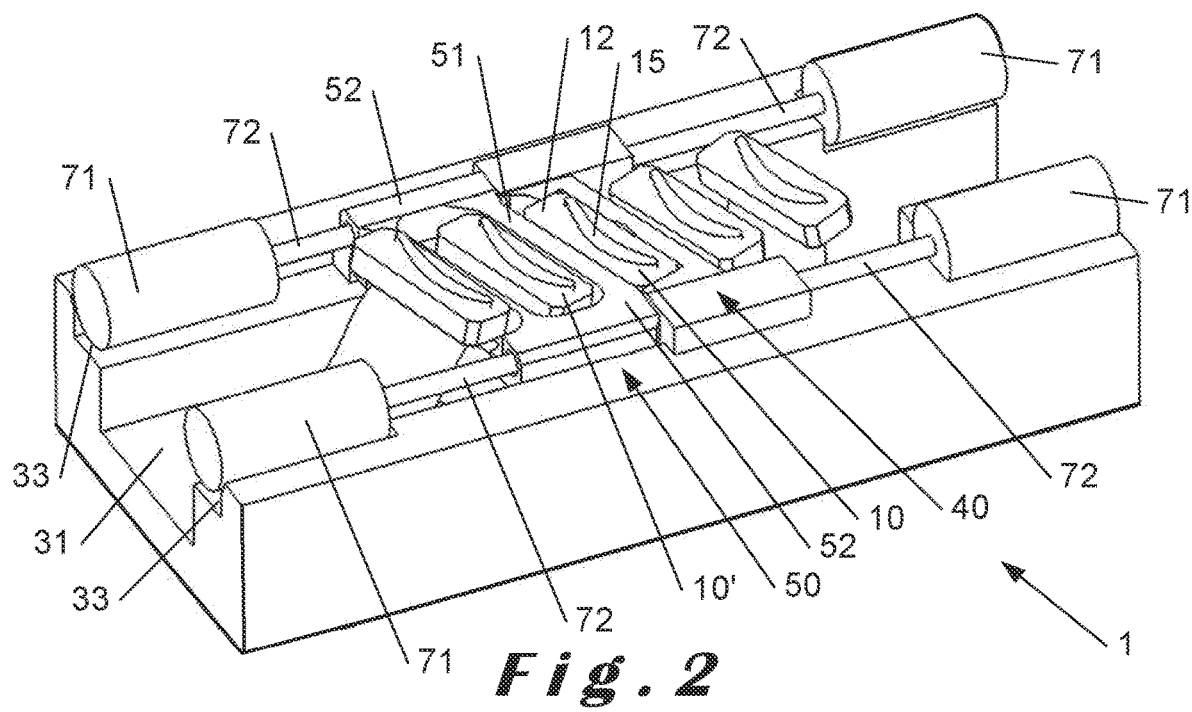
FIG. 2 shows the tooling in the presence of the blades to be welded, according to an embodiment of the disclosure.

FIG. 2 shows the tooling 1, according to an embodiment identical to that shown in FIG. 1, in which there is a blade 10 to be welded and other blades 10' already welded. The distance d between the arms 32 of the fixed jaw 30 and the depth of the tooling 1 are sufficient to completely accommodate a blade 10. The orientation of the arms 32 of the tooling 1 allows to simultaneously contain a plurality of blades 10 aligned on the drum 20. The configuration of the tooling 1 is such that the already welded blades 10' can be contained within the tooling 1 without contact with it. The blade 10 to be welded is contained between the fixed jaw body 40 and the movable jaw 50. The adjacent (already welded) blade 10' which is on the side of the movable jaw 50 is preferably contained without contact in the opening described by the movable bearing surface 51, the lateral edges 52 and the reinforcement portion 53 of the movable jaw 50. Preferably, the portion that comprises the movable bearing surface 51 and the reinforcement portion 53 have an identical thickness.

In normal use of the tooling 1 for welding a blade 10 to a drum 20, the platform 12 of the blade 10 is preferably parallel to the central part 31 and located at the upper end of the arms 32 (the central part 31 being located at the lower end of the arms 32), the functional part 13 of the blade 10 is preferably contained between the arms 32 and the assembly portion 15 is preferably located outside the tooling 1.

Figure 3:
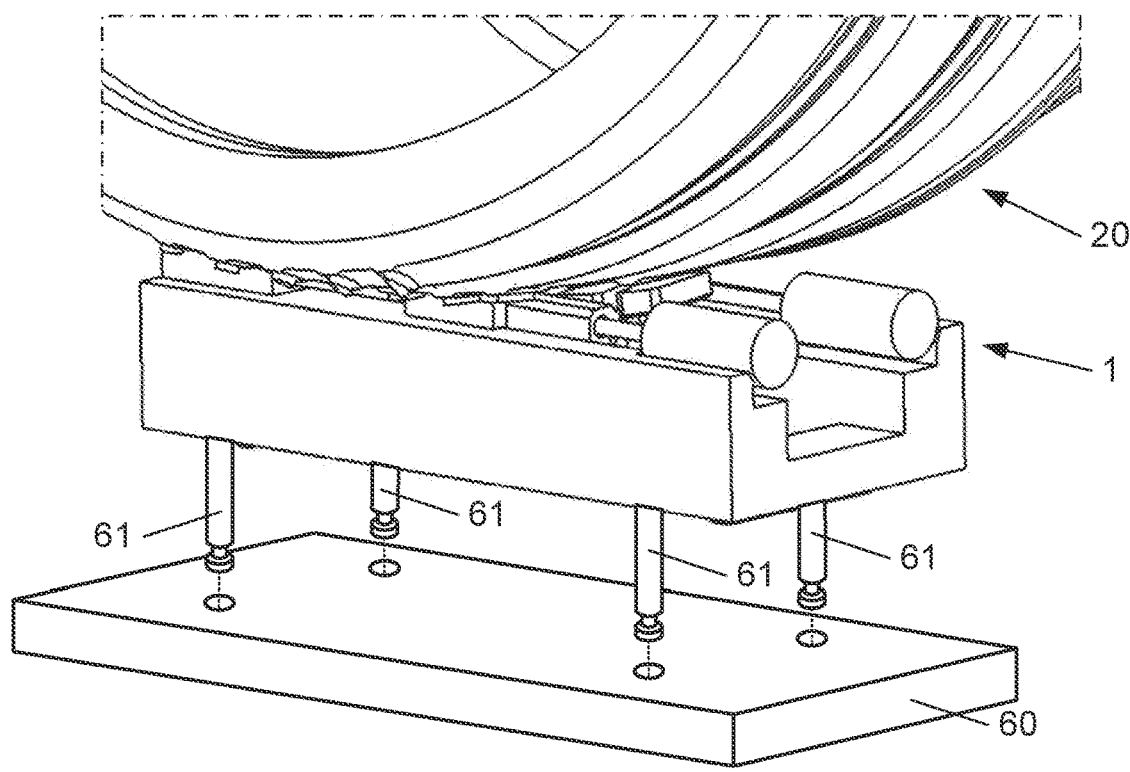
FIG. 3 shows the tooling, the vibrating plate and a drum according to an embodiment of the disclosure.

FIG. 3 illustrates the manner in which the tooling 1, the vibrating plate 60 and a drum 20 are arranged during the welding operation according to a preferred embodiment of the disclosure. Typically, the drum 20 of a low-pressure compressor of a turbomachine consists of a plurality of stages, each comprising a row of blades 10. As a stage of the drum 20 is circular, the blades 10 are aligned along the stage. Thus, when welding a blade 10 to a drum stage 20, the arms 32 of the tooling 1 are arranged in a direction tangential to the drum stage 20 so that the row of blades 10 can be contained between the arms 32. The assembly portion 15 faces the drum 20 and the functional portion 13 leaks from it.

Preferably, the tooling 1 is coupled to the vibrating plate 60 by means of pins 61. The pins 61 are attached to the lower part of the tooling 1, preferably to the central part 31, and are intended to be received by holes 62 in the vibrating plate 60 upon coupling.

The vibrating plate 60 is itself coupled to a friction welding machine. The vibrating plate 60 is arranged to provide tangential vibration relative to the drum 20 but also allows the tooling 1 to be moved away from and towards the drum 20, preferably in an automated manner. Once the blade 10 is tightened in the tooling 1, the vibrating plate 60 can move the blade 10 towards the drum 20 so as to bring them into contact. When the welding is complete and the blade 10 is tightened, the tooling 1 is moved away from the drum 20 and releases the welded blade 10.

Figure 4:
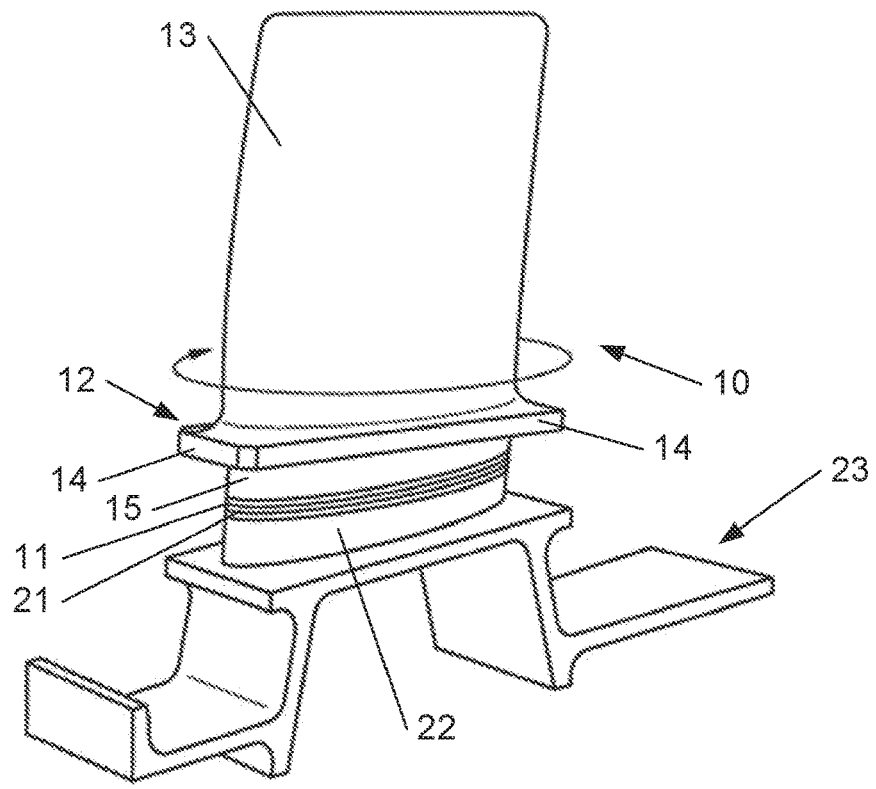
FIG. 4 shows a portion of a drum on which a blade is welded according to an embodiment of the disclosure.

FIG. 4 shows a portion of a drum 20 to which a blade 10 is welded in one embodiment. The platform 12 serves essentially as a means of gripping and positioning the blade 10 in a plane parallel to the plane of orbital or linear motion. Preferably, the assembly portion 15, which corresponds to a protrusion under the platform 12 is intended to be welded to the drum 20. This assembly portion 15 comprises an assembly surface 11 intended to be brought into contact with an assembly surface 21 belonging to an assembly portion 22 of the drum 20. The assembly portion 22 of the drum 20 also corresponds to a protrusion of the receiving area on the outer wall 23 of the drum 20.

In summary, the disclosure may be described as follows.

A tooling 1 for holding a blade 10 during friction welding thereof to a rotor element 20 of a turbomachine of an aircraft and comprising:
 a fixed jaw 30 comprising:
  a central part 31;
  two arms 32 separated by a distance d for receiving at least a portion of the blade 10;
  a fixed jaw body 40 comprising bearing surfaces 41 and a bore 42 for receiving at least a portion of the blade 10, the bearing surfaces 41 being intended to come into contact with the blade 10;
 a movable jaw 50 comprising a movable bearing surface 51 for coming into contact with the blade 10;
 pressure means 70 for moving the movable jaw 50 towards the fixed jaw body 40 for pressing the blade 10.

The invention claimed is:

1. A tooling for holding a blade during friction welding thereof to a rotor element of an aircraft turbomachine, comprising:
 a fixed jaw comprising:
  a central part adapted to be attached to a vibrating plate of a friction welding machine;
  two arms substantially parallel to each other, separated by a distance d for receiving at least a portion of the blade and substantially perpendicular to said central part; and
  a fixed jaw body disposed between the two arms, comprising bearing surfaces and a bore for receiving at least a portion of the blade, the bearing surfaces being intended to come into contact with faces of the blade;
 the tooling further comprising:
 a movable jaw configured to slide along the two arms and comprising a movable bearing surface configured to contact a face of the blade; and
 pressure means configured to move said movable jaw towards the fixed jaw body to press the blade between the movable jaw and the fixed jaw body.

2. The tooling according to claim 1, wherein each of the two arms of the fixed jaw comprises a groove.

3. The tooling according to claim 2, wherein the movable jaw comprises two lateral edges capable of sliding in the grooves of the arms.

4. The tooling according to claim 3, wherein the movable jaw comprises a reinforcement portion perpendicular to said two lateral edges.

5. The tooling according to claim 4, wherein the movable bearing surface, the lateral edges and the reinforcement portion define an open area configured to receive, during the welding of said blade, another adjacent blade already welded.

6. The tooling according to claim 5, wherein the pressure means configured to be controlled by a control unit.

7. The tooling according to claim 6, wherein the pressure means comprise one or more cylinders.

8. The tooling according to claim 7, wherein each cylinder comprises a piston mechanically coupled to said movable jaw.

9. The tooling according to claim 8, wherein each arm of the fixed jaw is configured to accommodate one or two cylinders from the one or more cylinders, so that the transmission of the force provided by said cylinder or cylinders is parallel to said arms.

10. The tooling according to claim 1, wherein the movable bearing surface of the movable jaw has a knurling.

11. The tooling according to claim 1, wherein the tooling is configured to hold a blade during the orbital friction welding of the blade.

12. The tooling according to claim 1, wherein the rotor element is a drum of a low-pressure compressor of a turbomachine of an aircraft.

13. An assembly for a friction welding process, comprising:
   a tooling according to claim 1;
   pins; and
   a vibrating plate configured to impart a vibratory motion to said tooling, the tooling being attached to the vibrating plate by means of said pins.

14. A method of friction welding a blade to a rotor element of an aircraft turbomachine, comprising the following steps:
   a. providing a tooling according to claim 1;
   b. providing a friction welding machine comprising a vibrating plate;
   c. attaching the central part of the tooling to said vibrating plate;
   d. arranging a portion of said blade to be welded in the bore of the fixed jaw body, so that the bearing surfaces come into contact with said blade;
   e. bringing into contact the movable bearing surface of the movable jaw with said blade;
   f. pressing said blade between the movable jaw and the fixed jaw body by means of the pressure means;
   g. bringing into contact said blade and said rotor element;
   h. actuating the friction welding machine so as to induce a relative movement between said blade and the rotor element to reach a welding temperature;
   i. stopping the vibrating plate and pressing said blade against said rotor element so as to join them together; and
   j. releasing said blade from the tooling.

15. The method according to claim 14, wherein the relative movement between said blade and the rotor element is an orbital movement.

* * * * *